(12) United States Patent
Yang et al.

(10) Patent No.: US 9,247,521 B2
(45) Date of Patent: Jan. 26, 2016

(54) LOCALIZATION BASED ON INDIVIDUAL LOCATION PATTERNS

(76) Inventors: Guang Yang, San Jose, CA (US); Du Li, Palo Alto, CA (US); Yifei Jiang, Longmont, CA (US); Zhigang Liu, Sunnyvale, CA (US)

( * ) Notice: Subject to any disclaimer, the term of this patent is extended or adjusted under 35 U.S.C. 154(b) by 7 days.

(21) Appl. No.: 13/819,824

(22) PCT Filed: Sep. 1, 2010

(86) PCT No.: PCT/IB2010/053930
§ 371 (c)(1),
(2), (4) Date: Jul. 12, 2013

(87) PCT Pub. No.: WO2012/028903
PCT Pub. Date: Mar. 8, 2012

(65) Prior Publication Data
US 2013/0288703 A1    Oct. 31, 2013

(51) Int. Cl.
*H04W 64/00* (2009.01)
*G01S 5/00* (2006.01)
*G01S 5/02* (2010.01)

(52) U.S. Cl.
CPC ........... *H04W 64/003* (2013.01); *G01S 5/0054* (2013.01); *G01S 5/0205* (2013.01); *H04W 64/00* (2013.01)

(58) Field of Classification Search
CPC ....... H04W 64/00; H04W 48/08; H04W 4/02; H04W 4/025; H04W 4/027; H04W 4/028; G06Q 30/0261; G06F 17/30041; G01S 19/48; G01S 5/0242; G01S 5/0009; G01C 21/206

USPC ................... 455/456.1–456.6, 574
See application file for complete search history.

(56) References Cited

U.S. PATENT DOCUMENTS

| | | | |
|---|---|---|---|
| 6,363,255 B1 * | 3/2002 | Kuwahara | 455/456.5 |
| 6,570,530 B2 * | 5/2003 | Gaal et al. | 342/357.23 |
| 7,096,030 B2 * | 8/2006 | Huomo | 455/456.3 |
| 7,319,413 B1 * | 1/2008 | Denker et al. | 340/988 |
| 2007/0026866 A1 * | 2/2007 | Krishnamurthi et al. | 455/440 |
| 2007/0248032 A1 * | 10/2007 | Vasudevan et al. | 370/315 |
| 2008/0274728 A1 * | 11/2008 | Anderson et al. | 455/423 |
| 2009/0181695 A1 * | 7/2009 | Wirola et al. | 455/456.1 |
| 2009/0192709 A1 * | 7/2009 | Yonker et al. | 701/215 |
| 2010/0004997 A1 * | 1/2010 | Mehta et al. | 705/14.66 |

(Continued)

FOREIGN PATENT DOCUMENTS

WO    2009/125812 A1    10/2009

OTHER PUBLICATIONS

Agamennoni G., et al, "Mining GPS data for extracting significant places," 2009 IEEE International Conference on Robotics and Automation, Kobe, Japan, May 12-17, 2009, pp. 855-862.

(Continued)

*Primary Examiner* — Nizar Sivji
(74) *Attorney, Agent, or Firm* — Locke Lord LLP

(57) ABSTRACT

A system that uses historical position information accumulated in an apparatus to determine whether locations and/or routes may be classified as significant. A classification of a location or route as significant may be utilized in configuring localization in the apparatus. Localization configuration may include, for example, setting a type technology utilized in determining apparatus position.

24 Claims, 8 Drawing Sheets

(56) References Cited

U.S. PATENT DOCUMENTS

| | | | |
|---|---|---|---|
| 2010/0175116 A1* | 7/2010 | Gum | 726/6 |
| 2010/0231383 A1* | 9/2010 | Levine et al. | 340/540 |
| 2011/0070863 A1* | 3/2011 | Ma et al. | 455/410 |
| 2011/0159884 A1* | 6/2011 | Chawla | 455/456.1 |
| 2011/0285591 A1* | 11/2011 | Wong | 342/451 |

OTHER PUBLICATIONS

International Search Report and Written Opinion completed May 11, 2011 in International Application Serial No. PCT/IB2010/053930, 11 pp.

D. Ashbrook and T. Starner, "Using GPS to Learn Significant Location and Predict Movement Across Multiple Users," Personal and Ubiquitous Computing, vol. 7, No. 5, 2003.

2. J.H. Kang; W. Welbourne, B. Stewart, and G. Borriello, "Extracting Places from Traces of Locations", ACM Mobile Computing and Communications Review, vol. 9, No. 3, 2005.

3. C. Zhou, D. Frankowski, P. Ludford, S. Shekhar and L. Terveen, "Discovering Personally Meaningful Places: An Interactive Clustering Approach", ACM Trans. Information Systems, vol. 25, No. 1, 2007.

4. L. Liao, D. Fox, and H. Kautz, "Extracting Places and Activities from GPS Traces using Hierarchical Conditional random Fields," International Journal of Robotics Research, vol. 26, No. 1, 2007.

5. G. Yang, "Discovering Significant Places from Mobile Phones" a Mass Market Solution, MELT Workshop 2009.

Skyhook Wireless, http://www.skyhookwireless.com, screenshot of website dated Feb. 24, 2014.

Navizon, http://www.navizon.com, screenshot of website dated Feb. 24, 2014.

Open Cell ID, http://www.opencellid.org, screenshot currently unavailable.

* cited by examiner

FIG. 5

| Timestamp | GPS Readings (latitude, longitude) | Wi-Fi Readings (MAC address) | Cellular ID Readings (mcc, mnc, lac, cid) |
|---|---|---|---|
| 1234567890 | 37.1234, -122.5678 | 01:23:45:67:89:AB<br>12:34:56:78:9A:BC | (310, 410, 567, 123) |
| 1234567900 | None | 01:23:45:67:89:AB<br>23:45:67:89:AB:CD | (310, 410, 567, 123) |
| 1234567910 | 37.1237, -122.5682 | None | (310, 410, 567, 123) |
| 1234567920 | 37.1239, -122.5684 | 56:78:9A:BC:DE:FF | None |
| ... | ... | ... | ... |
| 1234568710 | 37.1567, -122.5345 | FE:DC:BA:98:76:54 | (310, 410, 568, 567) |
| 1234568720 | 37.1568, -122.5343 | FE:DC:BA:98:76:54<br>ED:CB:A9:87:65:43<br>DC:BA:98:76:54:32 | (310, 410, 568, 678) |
| ... | ... | ... | ... |

| Timestamp | GPS Readings (latitude, longitude) | Wi-Fi Readings (MAC address) | Cellular ID Readings (mcc, mnc, lac, cid) | Place/Route Label |
|---|---|---|---|---|
| 1234567890 | 37.1234, -122.5678 | 01:23:45:67:89:AB<br>12:34:56:78:9A:BC | (310, 410, 567, 123) | Home |
| 1234567900 | None | 01:23:45:67:89:AB<br>23:45:67:89:AB:CD | (310, 410, 567, 123) | Home |
| 1234567910 | 37.1237, -122.5682 | None | (310, 410, 567, 123) | Home -> Work, Route #1 |
| 1234567920 | 37.1239, -122.5684 | 56:78:9A:BC:DE:FF | None | Home -> Work, Route #1 |
| ... | ... | ... | ... | ... |
| 1234568710 | 37.1567, -122.5345 | FE:DC:BA:98:76:54 | (310, 410, 568, 567) | Home -> Work, Route #1 |
| 1234568720 | 37.1568, -122.5343 | FE:DC:BA:98:76:54<br>ED:CB:A9:87:65:43<br>DC:BA:98:76:54:32 | (310, 410, 568, 678) | Work |
| ... | ... | ... | ... | ... |

LOCALIZATION BASED ON INDIVIDUAL LOCATION PATTERNS

BACKGROUND

1. Field of Invention

The present invention relates to electronic positioning, and in particular, to collecting location information over time for use in customizing apparatus localization.

2. Background

The integration of wireless communication functionality into both existing and emerging applications continues to expand. Strong demand has spurred developers to not only create more powerful communication devices, but also to introduce other helpful applications that rely upon wireless communication for support. In this manner, wireless communication has moved beyond the mere conveyance of voice data, and has evolved to make possible various applications for personal productivity, business, entertainment, etc.

At least one popular communication-based application that has emerged is electronic positioning. Electronic positioning may provide current location information for apparatuses in terms of coordinates, in relation to visual presentation (e.g., map), etc. However, the means for obtaining information upon which a position is determined may vary. For example, apparatuses may include Global Positioning System (GPS) receivers for obtaining location information (e.g. coordinates) from satellites. Long-range wireless communication systems may also support location estimation based on cell membership or even more specific location via methods such as cell-based triangulation. Short-range wireless systems are also emerging that may be able to provide location information via determinations of proximity (e.g., distance and direction) from wireless access points, etc.

Each of the aforementioned information sources for apparatus localization (e.g., positioning) have certain characteristics that make their utilization more appropriate in different situations. For example, GPS is known to provide refined position resolution, but this enhanced resolution may come at the cost of higher processing and energy burden when compared to other positioning technologies. On the other end of the spectrum, cell membership may provide localization much more efficiently, but at a substantially lower position resolution. Often, the selection of positioning technology is at the whim of the user. Users often may select the best available technology without considering the effect of utilization on apparatus resources, leaving these users to wonder why apparatuses need to be recharged so frequently. Existing automated positioning control systems offer only marginal improvement. Such solutions are implemented using generic algorithms that act in the same manner regardless of apparatus, user habits, tendencies, current situation, etc.

SUMMARY

Example embodiments of the present invention may be directed to a method, computer program product, apparatus and system that uses historical position information accumulated in an apparatus to determine whether locations and/or routes may be classified as significant. A classification of a location or route as significant may be utilized in configuring localization in the apparatus. Localization configuration may include, for example, setting a type technology utilized in determining apparatus position.

Apparatuses may receive position information via various technologies in the course of normal operation. The received position information may be accumulated over time in the apparatus or another apparatus (e.g., a server in communication with the apparatus), and may be evaluated in either or both apparatuses to determine if it describes significant places or routes. For example, if a current location of the apparatus is determined to be a significant place or route, then a further determination may be made as to whether existing classification criteria may be used to classify the significant place or route. If existing classification criteria is applicable, a localization configuration may be applied to the apparatus based on the classification.

In accordance with at least one embodiment of the present invention, new classification criteria may be generated for each significant place or route if no existing classification criteria is applicable. Classification criteria may be based on, for example, at least one of position resolution criteria and energy consumption criteria. If necessary, the new classification criteria may then be merged or reconciled with existing classification criteria and applied to future significant places or routes. As set forth above, classification criteria may be utilized to set a localization configuration in the apparatus. For example, at least one of Global Positioning System (GPS), local-area networking or cellular membership may be set for use in localization in the apparatus.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 5 discloses example electronic positioning information obtained via various technologies in accordance with at least one embodiment of the present invention.

FIG. 7 discloses an example classification information in accordance with at least one embodiment of the present invention.

DESCRIPTION OF EXAMPLE EMBODIMENTS

Figure 1:
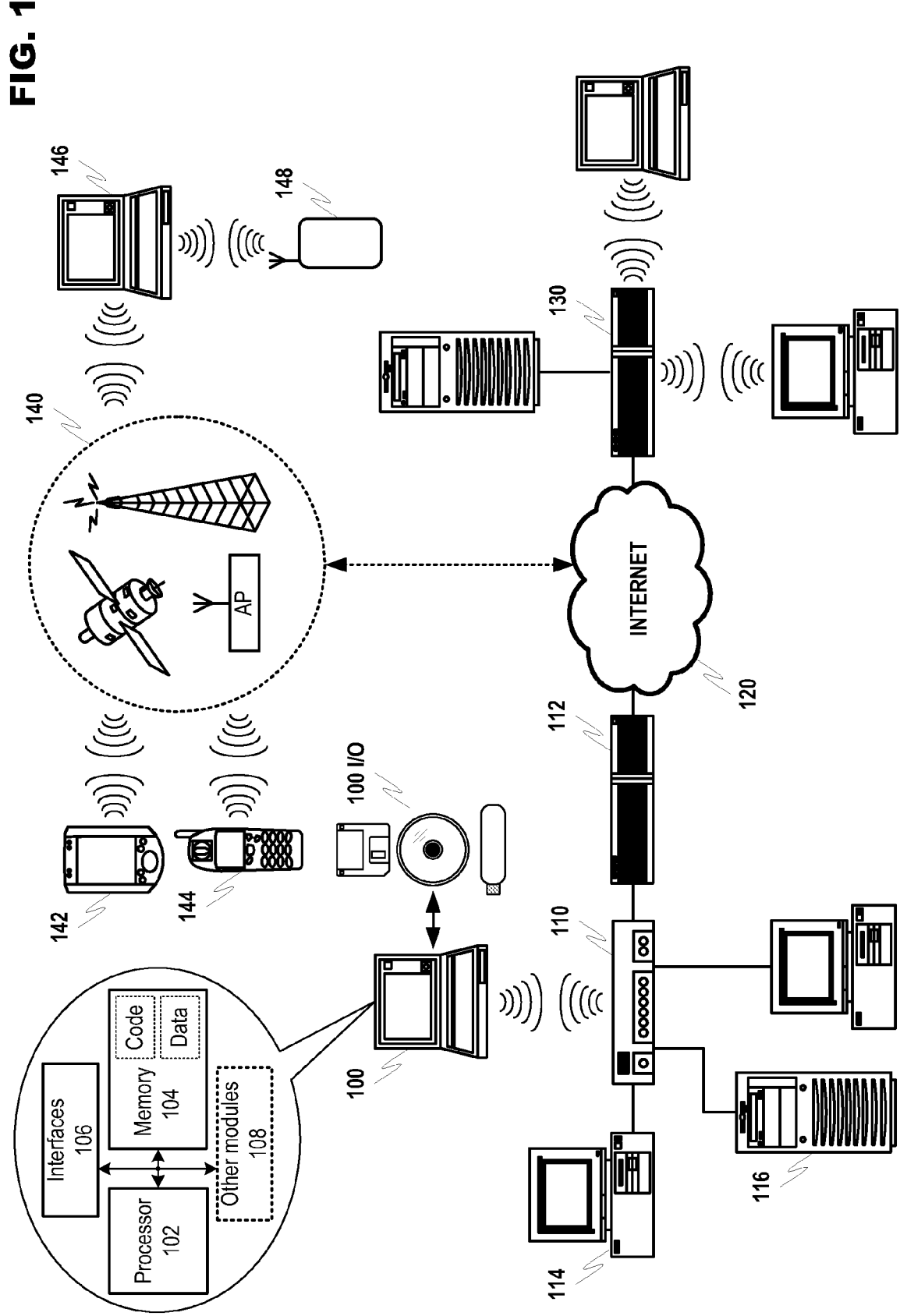
FIG. 1 discloses example apparatuses, communication configuration and network architecture usable with at least one embodiment of the present invention.

While the invention has been described below in terms of a multitude of example embodiments, various changes can be made therein without departing from the spirit and scope of the invention, as described in the appended claims.

I. Example System With Which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 2:
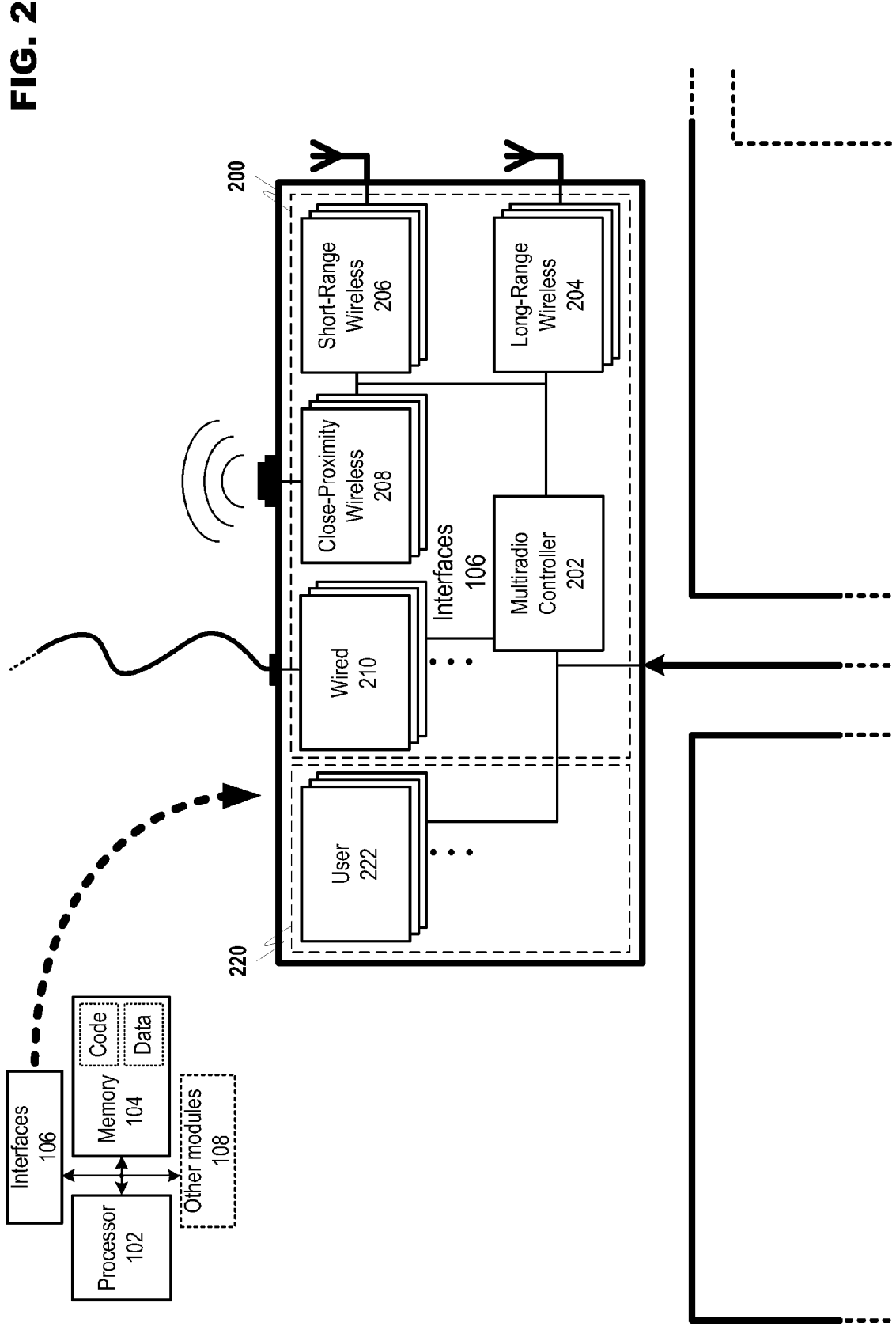
FIG. 2 discloses additional detail with respect to example communication interfaces usable with at least one embodiment of the present invention.

Further detail regarding example interface component 106, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

Figure 3:
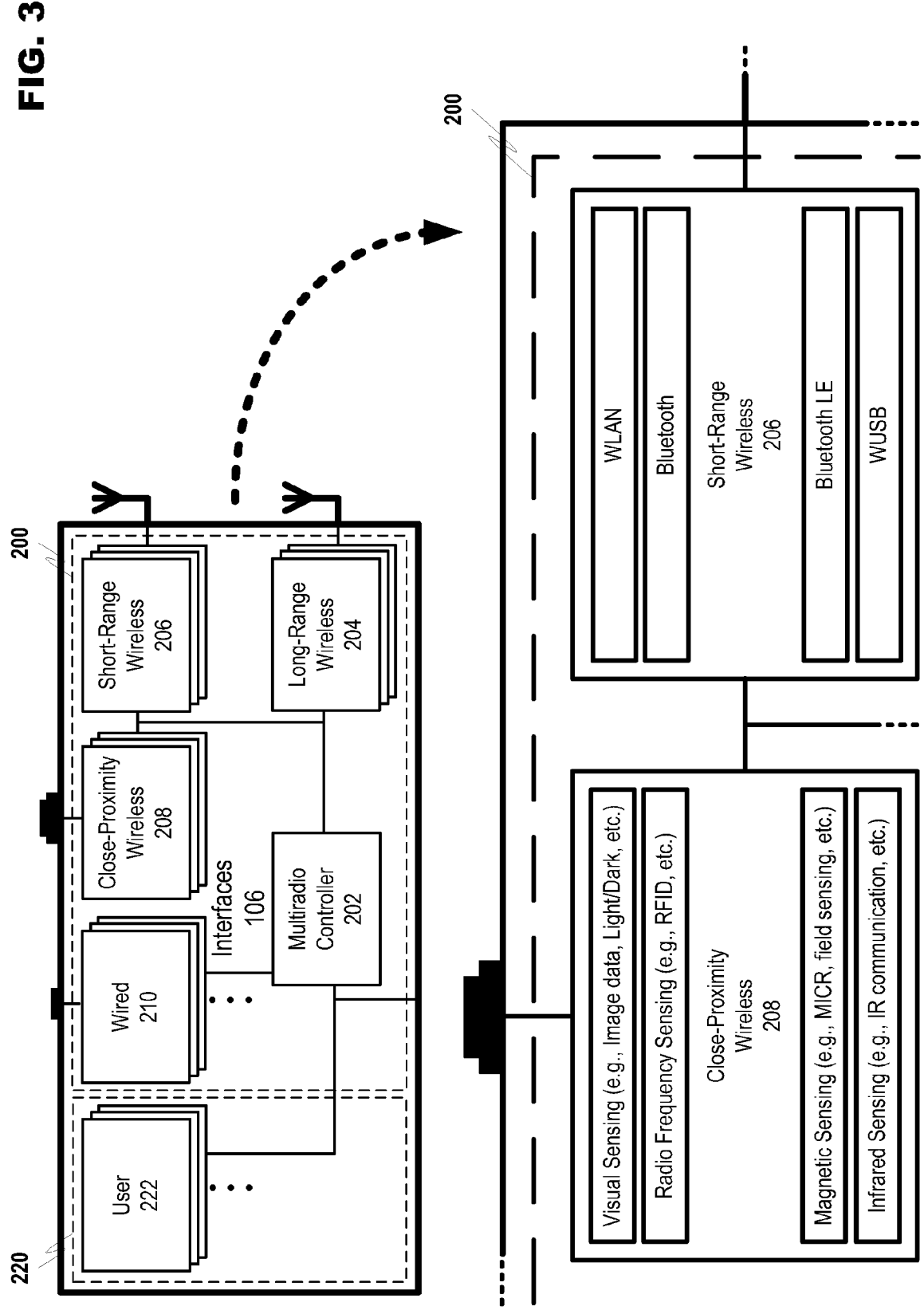
FIG. 3 discloses additional detail with respect to example close proximity and short range interfaces usable with at least one embodiment of the present invention.

The example communication interface configuration 106 disclosed in FIG. 2 may, in accordance with at least one embodiment of the present invention, further comprise example close-proximity wireless interfaces 208 such as set forth in FIG. 3. Resources for visual sensing may comprise at least a camera or similar sensor device capable of recording moving and/or still image data, light/dark data, color data, etc. Other examples of close-proximity sensing interfaces that may be incorporated in apparatuses may include, but are not limited to, transmission/reception interfaces for Near Field Communication (NFC), radio frequency (RF) transceivers for communicating data such as radio frequency identification (RFID) information, magnetic sensors for magnetic ink character recognition (MICR), magnetic field detection, etc., and infrared (IR) transmitters/receivers for communicating IR information over short distances.

Moreover, example short-range wireless interface 206 may comprise hardware and/or software resources for supporting various forms of short-range wireless communication. Examples of wireless communication that may be supported by interface 206 may include, but are not limited to, wireless local-area networking (WLAN), Bluetooth (BT) communication, Bluetooth Low Energy (BTLE) communication, wireless Universal Serial Bus (WUSB) communication, Ultra-wideband (UWB), etc. These forms of communication may, in various applications, support wireless interaction between two or more handheld wireless communication devices, between handheld wireless communication devices and stationary access points (AP), to peripheral interface devices, etc.

II. Example Operational Environment

Localization, or the process of determining user/apparatus location based on received electronic signals, is useful and valuable functionality that may be provided by mobile devices. The electronic information used in localization may be provided via various technologies including, but not limited to, satellite-based systems such as GPS in which apparatuses calculate location based on signals received from multiple satellites, cellular network-based systems and short-range wireless networks (e.g., Wi-Fi). In the case of cellular and short-range wireless networks, apparatuses may calculate location based on the locations of surrounding base stations which are used as reference points. While Wi-Fi may be used in the following disclosure in general reference to short-range wireless networking, the wireless protocols utilized in such systems is not strictly limited to wireless local area networking (WLAN) as defined under the IEEE 802.11 standard. On the contrary, it may be possible to employ other short-range wireless protocols, such as referenced above, in accordance with various embodiments of the present invention.

Figure 4:
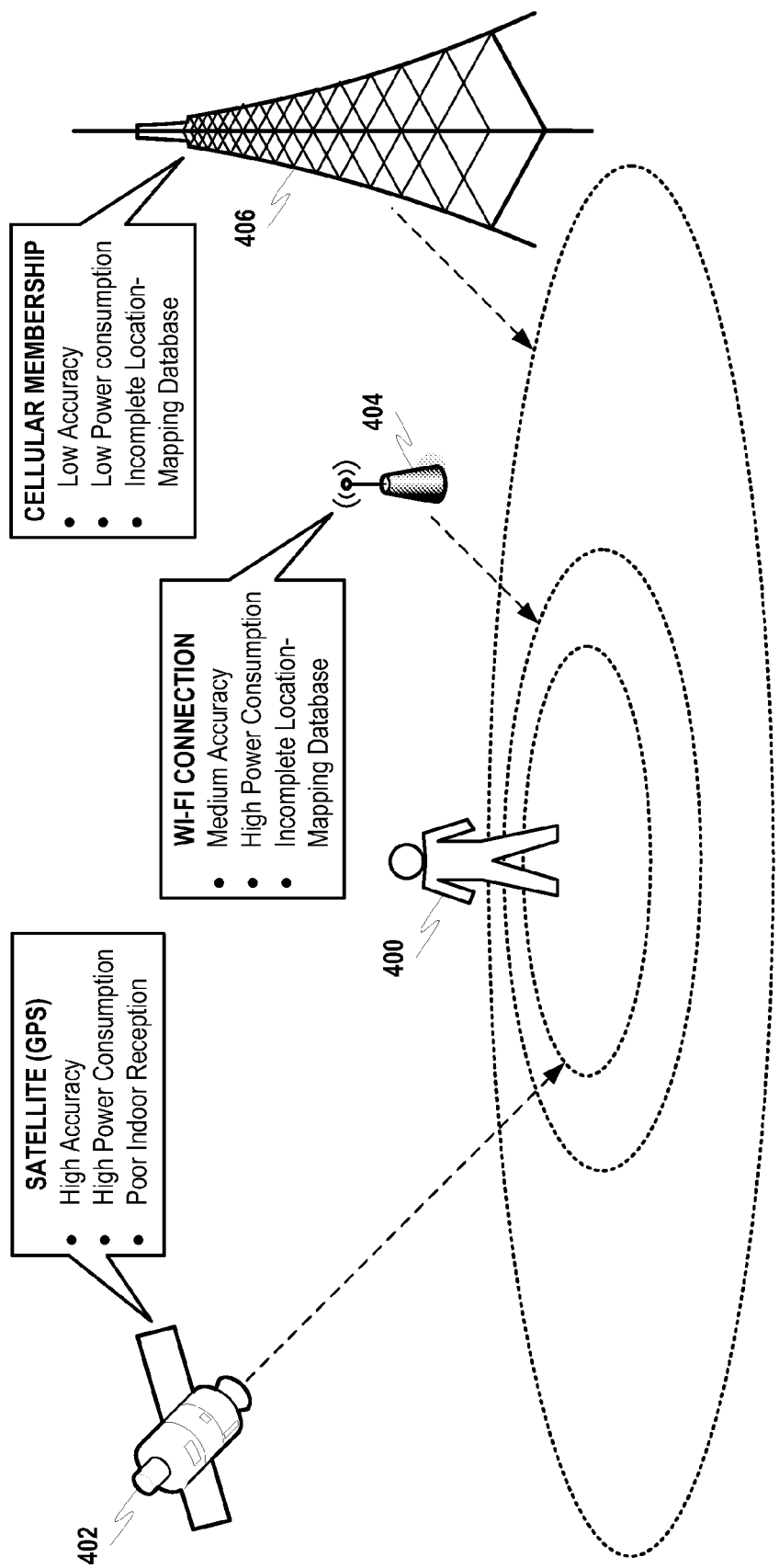
FIG. 4 discloses an example operational environment and positioning technologies in accordance with at least one embodiment of the present invention.

FIG. 4 discloses an example of user 400, who may be equipped with (e.g., carrying) an apparatus (such as disclosed above in FIG. 1 at 100). In order to determine the position of user 400, an apparatus may receive information via electronic wireless transmission and may resolve a relative or absolute position based on the received information. Localization via GPS 402, despite having expansive coverage and high accuracy, is known to have several drawbacks. GPS 402 is generally considered to have relatively high energy consumption, poor reception in certain areas (such as indoors and in urban settings), slowness in locking on satellite signals, etc. As a result, short-range wireless network-based solutions (e.g., Wi-Fi) 404 and cellular-based systems 406 have gained in popularity. Wi-Fi 404 and cellular 406 may overcome some of the drawbacks seen in GPS, but at the same time may include other weaknesses such as smaller coverage areas due to difficulty in constructing location maps of base stations, less accuracy due to the inherent limitations of short-range and long-range radios, errors due to the reliance upon constructed location maps, etc.

In practice, apparatuses may rely upon a combination of technologies to perform localization. Such multimodal methodologies attempt to leverage the benefits of each technology to overcome the weaknesses of the others by using them in an integrated manner. For example, Wi-Fi and cellular-based methods may initially provide quick, but rough, location estimates that may be later refined using GPS, if necessary. Existing multimodal systems generally provide a "one-size-fits-all" approach optimized based on the location itself, regardless of who uses it. For example, if two users were to execute the same localization methodology side-by-side they would trigger the same algorithmic flow and, excluding randomness, receive essentially identical results including the same geo-coordinates and accuracy, while incurring the same delay and energy costs.

However, such user-agnosticism may no longer be the right approach for localization. Legacy systems may have served well when location-based services were primarily instantaneous and memory-less applications that would "find where I am, show me some local information, and done" (and then start all over again). In simple scenarios specific location history and patterns for users did not matter, and objective and accurate measurement was more important. However, the requirements for positioning solutions are changing. Localization has increasingly become a continuous measure as part of the ever-evolving user context. Existing non-personalized positioning solutions fail to take into consideration the very diverse histories, patterns and interpretations of location among users, and as a result, may provide less-than-desirable results.

III. Examples of Personalized Localization

Users spend most of their time at a small number of places, or repeatedly en-route between these places. They may be labeled with names such as "Home," "Work," "Kid's School," etc. It may be extremely valuable to be able to identify these frequently visited places, and accordingly a user's location history/patterns, to facilitate a broad range of applications including context-aware User Interfaces (UI), smart commute services, targeted advertising, abnormal behavior detection, etc. These frequently visited places may vary greatly from person to person. For example, a user may go to several places that are very close to each other, yet may consider each of the places meaningful and distinct; while another user's places may be spread out. For example, a user's "Home" may be close (e.g., 100 m) or far (e.g., 100 km) from his/her "Work." Existing multimodal localization ignores such differences and always tries to provide the most-accurate result possible. However, given an example scenario wherein GPS, Wi-Fi and cellular-ID-based mechanisms are able to achieve approximate accuracy granularities of 20 m, 50 m and 1000 m, respectively, and likewise each typically consume energy at a rate of 400 mW, 400 mW and 10 mW, GPS and/or Wi-Fi would have to be employed to differentiate between place that are "close" (at a higher resource cost), while the cheaper cellular-ID mechanism alone may be sufficient to provide localization between places that are "far" apart. Utilizing a 20 m-50 m resolution in the latter case may be considered a waste of energy where non-personalized localization is not employed. Batteries in mobile apparatuses drain quickly without personalized localization, wasting energy by obtaining highly accurate results that are unnecessary. Personalization allows apparatuses to disable high consumption resources (e.g., GPS/Wi-Fi) in favor of low cost resources (e.g., cellular IDs) when lower-accuracy mechanisms may be adequate for localization (e.g. when differentiating between two routes that are kilometers apart).

In accordance with at least one embodiment of the present invention, a multimodal localization solution may be implemented that considers the specific location history and patterns for a user when performing positioning. Such systems may balance the dual goals of accuracy and energy consumption while still delivering acceptable performance. In at least one example implementation, the system may be situated totally in a single apparatus (e.g., a mobile user device), allowing all information collection and processing to occur within the same device. However, configurations are also possible wherein user apparatuses may interact with remotely-located resources, such as other apparatuses (e.g., other wireless devices, databases, servers, etc.) that are in communication with the user apparatuses. In the latter case, user apparatuses may rely upon the remotely-located resources for some or all of the information processing that may occur to information that is initially collected by the user apparatuses. The other apparatuses may then provide results from their processing back to the user apparatuses for use in providing the ultimate deliverable to the user (e.g., configuring localization).

Initially, the system may begin by collecting location data. Apparatuses know nothing about the mobile user when the system is first activated, and must collect location data for training. As part of this training, the system may monitor user location changes and collect various trace data such as GPS readings, scanned Wi-Fi base stations and surrounding cellular IDs. In some embodiments data collection may be expedited or enhanced through interaction with remote resources. For example, if a server knows the locations of certain Wi-Fi and/or cellular towers, this information may be provided to complement the knowledge of user apparatuses. Embodiments of the system may then proceed to identify significant places or routes. When enough trace data has been collected, pattern recognition may be applied to identify significant places and routes based on recorded user information. Significance may bear different meanings in different implementations, to which various embodiments of the present invention may be agnostic.

After significant places or routes have been established, classification criteria corresponding to each place or route may be established. Establishing classification criteria may comprise, in accordance with at least one embodiment of the present invention, the application of data mining and machine learning techniques to find the best criteria to classify each significant place and route, given certain constraints of accuracy, energy consumption, etc. These criteria may be optimized for, and may be specific to, a particular user location history and patterns, and may not be applicable to other users even if they share common places or routes. For example, even if users visit the same locations, their pattern of travel, duration of visit, etc. may be dissimilar, which may result in totally different classification criteria. If possible, the apparatus may then apply existing criteria in future classification. Future place or route classification may be based on existing criteria, unless all existing criteria fail to produce credible results. This may occur in situations where user patterns have changed, where the apparatus may be entering uncharted territory, etc. In such instances the significance determination and classification steps may be revisited until existing or new criteria becomes applicable. Existing and newly generated criteria may also be merged and reconciled, if necessary.

In accordance with at least one embodiment of the present invention, readings from GPS, Wi-Fi and the cellular radio may be periodically sampled and saved to the local file system of an apparatus (e.g., a mobile device). An example of information that may be obtained in an apparatus is disclosed in FIG. 5 in table 500. Readings from GPS may comprise geo-coordinate tuples consisting of the latitude, longitude, altitude, horizontal accuracy, vertical accuracy, satellite information, etc., or a subset of these measurements. Readings from Wi-Fi map comprise Media Access Control (MAC) addresses and names of Wi-Fi base stations, and possibly other devices that are operating in an ad hoc mode. Readings from cellular systems may include a cellular ID comprising four parts: mobile country code (mcc), mobile network code (mnc), location area code (lac) and cellular id (cid), and signal strength from the connected cell. In some instances cellular operating systems may also provide information about other surrounding cells in a so-called "field test" mode. Table 500 shows an illustrative example of recorded trace data in the form of a table. Each row corresponds to data samples that consist of readings from GPS, Wi-Fi and cellular radio. The sampling frequency is once every 10 seconds.

IV. Examples of Identifying and Classifying Significant Places/Routes

Various methodologies may be employed in defining and identifying significant places and routes based on collected location trace data. In accordance with at least one embodiment of the present invention, the actual implementation of the system may be agnostic as to how significant places/routes are defined and identified. Methods for identifying significant places may be based on, for example, how long a user stays at a place, when he/she visits a place, how frequently he/she visits a place, etc. Identification methodologies may be fully automated, or in some cases may require human interaction. For example, we may define a significant place to be a circular area having a radius of up to 500 m in which the user has spent at least 30 minutes continuously for a single primary purpose. It may also be possible for users to manually indicated or tag significant places. After at least two significant places are identified, transitions between two significant places may be identified as a significant route.

Figure 6:
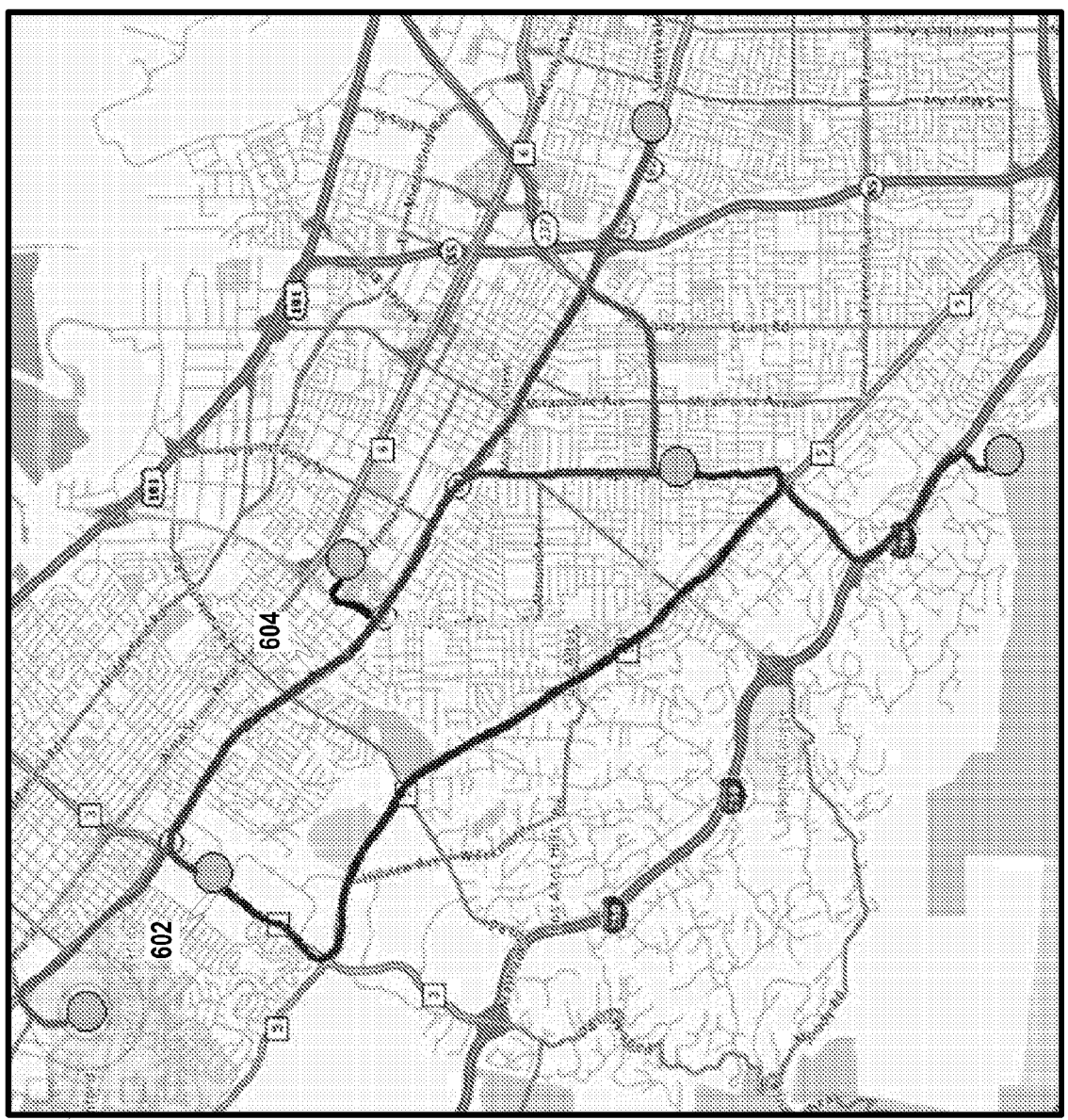
FIG. 6 discloses example significant place or route classification in accordance with at least one embodiment of the present invention.

FIG. 6 shows an example of significant places and routes identified from a user's trace data represented on map 600. Circles 602 represent significant places while emphasized (colored or darkened) lines 604 represent significant routes between places. After significant places and routes are identified, another column may be added to the location trace data so that it becomes a classification training set. See table 700 in FIG. 7 for an example. The last column in FIG. 7 is a classification label, which may be blank if, for example, the sample does not correspond to any significant place or route. FIG. 7 discloses human-friendly labels such as "Home," "Work,"

and "Home→Work, Route #1," but system-generated labels such as P1, P2 and P1:P2:R1 may work equally well for classifiers. Various classification algorithms may be employed to the training set to produce a classifier, such as the Decision Tree, Support Vector Machine or K-Nearest Neighbor. In addition to accuracy, energy consumption and/or other costs may also be considered to evaluate the classifier. For example, for a given classifier "C" the classification criteria "F(C)" may be a function of both accuracy and energy consumption:

$$F(C) = F(A(C), E(C)) \quad (1)$$

where A(C) is the required accuracy associated with C and E(C) is the expected energy consumption for C. A(C) may be determined based on classification results, while E(C) may be calculated based on classification algorithms involving the power usage of one or more of GPS, Wi-Fi and cellular IDs. For example, the energy cost of GPS is generally comparable to the cost of Wi-Fi scanning, and both of these localization technologies have a substantially greater expected energy burden when compared to just utilizing cellular IDs for positioning. The classifier that is selected is the one that has the highest F(C) score (e.g., $C = \text{argmax}_C F(C)$). How to select the score function F(C) may vary based on implementation. For example, in accordance with at least one embodiment of the present invention the function F(C) may be defined simply as picking the least costly classifier that meets the minimum accuracy requirement:

$$F(C) = -\text{infinity, if } A(C) < \text{required minimum accuracy threshold} \quad (2)$$

$$F(C) = -E(C), \text{ otherwise} \quad (3)$$

Generated criteria may be immediately applied to future classification. Since the classifier is tuned towards a user's specific location history and patterns, it may be intelligent enough to pick the best localization strategy for that particular user. In an real-world example of personalization, "Alice" may live in Menlo Park, Calif. and work in San Francisco. Alice may also shop in Mountain View and frequent a church in San Jose. All these places are at least 5 km away from each other. The best localization strategy therefore may be to use only cellular IDs, which are capable and economical. In a different example, "Bob" may live next door to Alice. However, Bob may work at a restaurant down a few street blocks. Bob may also shop in Mountain View but may go to a local church in Menlo Park. The places corresponding to Home, Work and Church for Bob are all too close to be adequately differentiated using cellular IDs, but Wi-Fi and/or GPS may provide acceptable resolution in these situations. Cellular ID works still may be suitable for other places frequented by Bob, such as the places where he goes shopping, etc. User apparatuses may also upload classification criteria to a server for aggregation across multiple users. While a goal of the localization solution, as set forth herein, may be to provide a personalized approach, such a goal does not completely rule out cross-user validation. For some popular places/routes, other users' classification criteria could be used for first screening.

When users begin to gradually change their location patterns, or visit new places, existing classification criteria may be deemed unsuitable. As a result, it may be time to update criteria by re-launching significant place or route determination, followed by significant place or route classification. In accordance with at least one embodiment of the present invention, there are multiple ways to merge new criteria with old criteria. For example, if a new criterion is disjoint with any old ones, it may simply be added to the criteria database. If a new criterion overlaps with some existing criteria, but there are no conflicts, the new and old criteria may be merged together. If a new criterion conflicts with at least one existing criterion, overwrite the old with the new. Existing criteria that have not been applied for a long time may be purged. Such criteria may have been created due to errors, a one-time visit to a place (e.g., a vacation) or the user has simply abandoned the previous identified as significant places/routes.

Figure 8:
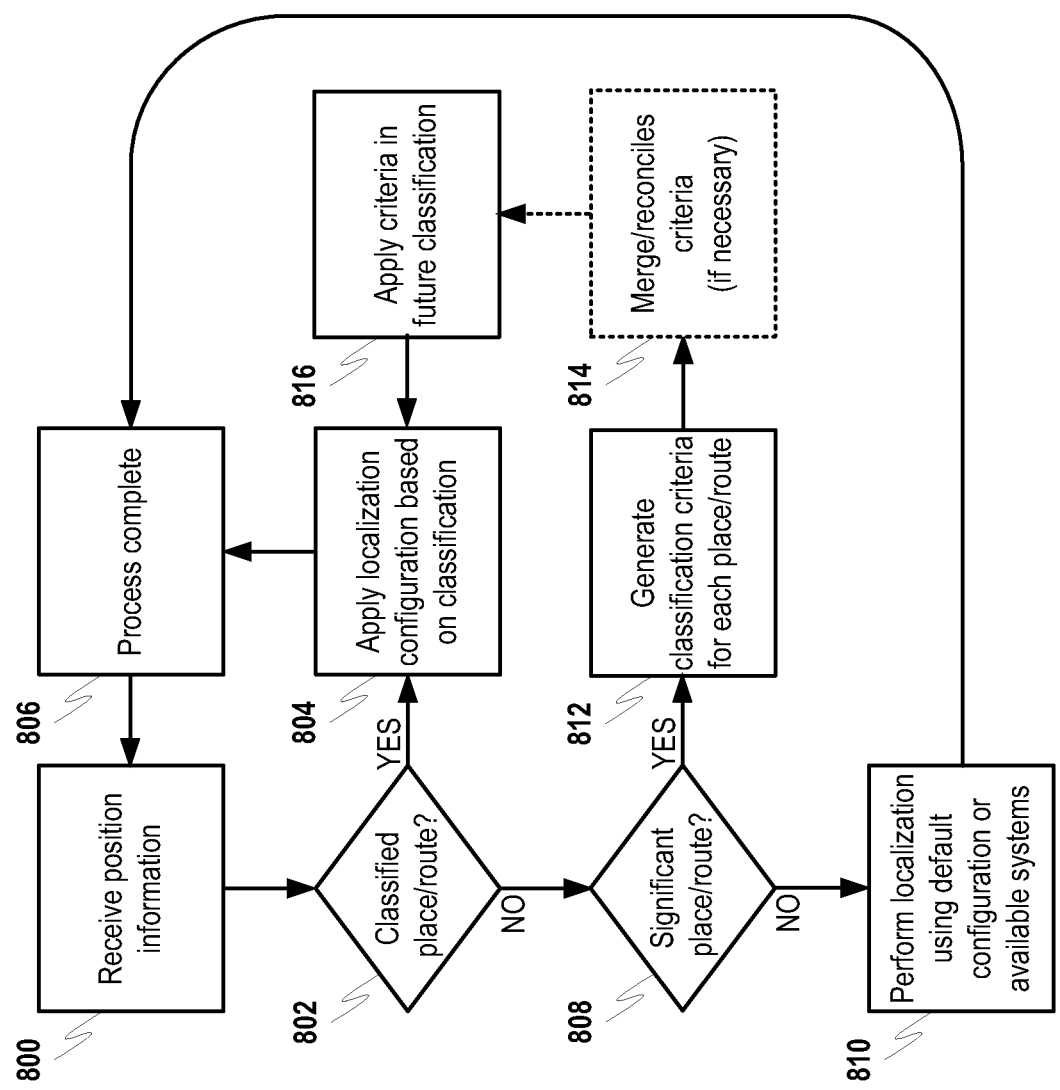
FIG. 8 discloses a flowchart for an example classification and positioning process in accordance with at least one embodiment of the present invention.

A flowchart for an example determination, classification and application process, in accordance with at least one embodiment of the present invention, is now disclosed in FIG. 8. In step 800 an apparatus, such as the example apparatuses described above with respect to FIG. 1-3, may receive position-indicating information. Position-indicating information may be received via various localization technologies, including at least the example technologies previously described herein including GPS, Wi-Fi connection and cellular membership. A determination may then be made in step 802 as to whether a significant place or route may be recognized, based on the received position-indicating information, using previously generated criteria. In order to reduce energy consumption, localization technologies having higher energy consumption, such as GPS and Wi-Fi connection, may be involved only when technologies having lower energy consumption, such as cellular membership, are unable to recognize the significant place or route alone. If in step 802 the current position of the apparatus is determined to correspond to a significant place or route, then in step 804 a localization configuration may be applied to the apparatus for use in positioning. For example, the localization configuration may set a localization technology (e.g., GPS, Wi-Fi connection or cellular membership) for use in determining the position of the apparatus while in the significant place or traversing the significant route. The process may then be complete in step 806 and may then return to step 800 in preparation for the next receipt of position-indicating information into the apparatus.

If in step 802 it is determined that the current location of the apparatus does not correspond to a previously classified significant place or route, then in step 808 a further determination may be made as to whether the current location of the apparatus should be deemed as a significant place or route. This classification may be based on, for example, information collected over time in the apparatus. This accumulated information may be examined, for example, using data-mining and machine learning techniques in order to identify places or routes that are frequently visited or utilized by a user. This determination may be based on various factors pertaining to both the user and the location. With respect to the user, the criteria may analyze how often the user visits the location, the total duration of the user's visit to the location, the number of different stops the user makes within the boundary of the location and the distance between each of these stops, etc. With respect to the location, the criteria may analyze what localization technologies are available in the location, the reliability (e.g., signal strength, interference, etc.) of the signals associated with each of the localization technologies, the types of routes (e.g., local/highway) within the location, etc. If in step 808 the current place or route is deemed to have no significance, then in step 810 the apparatus may operate in a default configuration or utilizing whatever localization technology is available. The process may then terminate in step 806 and return to step 800 as previously set forth.

On the other hand, if in step 808 a determination is made that the current location of the apparatus may be deemed a significant place or route, the process may move to step 812 where new classification criteria may be generated for the place or route. The classification criteria may be generated, for example, using the previously disclosed functions related to position resolution and energy consumption. As an optional step, existing classification criteria and new classification criteria may then be merged or reconciled in required in step 814. Merging and/or reconciling may comprise evaluating the new and existing classification criteria to look for similarities or differences, and then replacing duplicate, unused or expired classification criteria. The process may then proceed to step 816 where the new classification criteria may be applied to the current place or route, and may continue as previously described above.

While various example configurations of the present invention have been disclosed above, the present invention is not strictly limited to the previous embodiments.

For example, the present invention may include, in accordance with at least one example embodiment, an apparatus comprising means for receiving position information in an apparatus, means for determining whether the current location of the apparatus was previously classified as a significant place or route based on the position information, and means for, if the current location of the apparatus was previously classified, applying a localization configuration in the apparatus based on the previous classification.

At least one other example embodiment of the present invention may include electronic signals that cause apparatuses to receive position information in an apparatus, determine whether the current location of the apparatus was previously classified as a significant place or route based on the position information, and if the current location of the apparatus was previously classified, applying a localization configuration in the apparatus based on the previous classification.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    selecting, by an apparatus, a localization configuration from a plurality of localization configurations, the selected localization configuration for use by the apparatus to determine positioning whenever the apparatus is at a particular location that is also classified as a significant place or route for the apparatus,
    wherein a localization configuration that provides positioning information at the particular location that is less accurate than positioning information provided by other localization configurations at the particular location is selected if it is determined that the less accurate positioning information provided by the selected localization configuration distinguishes the particular location from any another location that is also classified as a significant place or route for the apparatus; and
    wherein a localization configuration that provides positioning information at the particular location that is more accurate than positioning information provided by other localization configurations at the particular location is selected if it is determined that the less accurate positioning information provided by the other localization configurations does not distinguish the particular location from any other location that is also classified as a significant place or route for the apparatus;
    receiving position information in the apparatus;
    determining whether the current location of the apparatus was previously classified as a significant place or route based on the position information;
    if the current location of the apparatus was previously classified, applying a localization configuration in the apparatus based on the previous classification; and
    if the current location of the apparatus was not previously classified, determining if the current location of the apparatus is considered a significant place or route by evaluating location information accumulated in the apparatus over time to determine whether the apparatus has frequently visited the current location,
    wherein the other localization configurations comprise at least one of a satellite-based system, a cellular network-based system and a short-range wireless network.

2. The method of claim 1, wherein at least one of the determining and applying steps are performed by another apparatus in communication with the apparatus.

3. The method of claim 1, wherein evaluating location information comprises considering at least one of user factors including number of visits to a location, duration of visits to the location, total number of different stops made within the boundaries of the location and distance between each of the stops, and location factors including what localization technologies are available in the location, reliability for each of the localization technologies and route types in the location.

4. The method of claim 1, wherein if the current location of the apparatus can be considered a significant place or route, generating new classification criteria for the significant place or route.

5. The method of claim 4, further comprising reconciling or merging the existing classification criteria with the new classification criteria.

6. The method of claim 1, wherein the classification criteria is based on at least one of position resolution criteria and energy consumption criteria.

7. The method of claim 1, wherein applying the localization configuration comprises setting at least one of Global Positioning System (GPS), local-area networking or cellular membership for use in localization in the apparatus.

8. A computer program product comprising a non-transitory computer readable storage medium having computer executable program code recorded thereon, the computer executable program code comprising:
    code configured to cause an apparatus to select a localization configuration from a plurality of localization configurations, the selected localization configuration for use by the apparatus to determine positioning whenever the apparatus is at a particular location that is also classified as a significant place or route for the apparatus,
    wherein a localization configuration that provides positioning information at the particular location that is less accurate than positioning information provided by other localization configurations at the particular location is selected if it is determined that the less accurate positioning information provided by the selected localization configuration distinguishes the particular location from any another location that is also classified as a significant place or route for the apparatus; and
    wherein a localization configuration that provides positioning information at the particular location that is more accurate than positioning information provided by other localization configurations at the particular location is selected if it is determined that the less accurate positioning information provided by the other localization configurations does not distinguish the particular location from any other location that is also classified as a significant place or route for the apparatus;

code configured to cause an apparatus to receive position information;

code configured to cause an apparatus to determine whether the current location of the apparatus was previously classified as a significant place or route based on the position information;

code configured to cause an apparatus to, if the current location of the apparatus was previously classified, apply a localization configuration in the apparatus based on the previous classification; and code configured to cause an apparatus to, if the current location of the apparatus was not previously classified, determine if the current location of the apparatus is considered a significant place or route by evaluating location information accumulated in the apparatus over time to determine whether the apparatus has frequently visited the current location, wherein the other localization configurations comprise at least one of a satellite-based system, a cellular network-based system and a short-range wireless network.

9. The computer program product of claim 8, wherein at least one of the code configured to cause the apparatus to perform the determining and applying steps is executed by another apparatus in communication with the apparatus.

10. The computer program product of claim 8, wherein the code configured to cause the apparatus to evaluate location information further comprises code configured to cause the apparatus to consider at least one of user factors including number of visits to a location, duration of visits to the location, total number of different stops made within the boundaries of the location and distance between each of the stops, and location factors including what localization technologies are available in the location, reliability for each of the localization technologies and route types in the location.

11. The computer program product of claim 8, further comprising, if the current location of the apparatus can be considered a significant place or route, code configured to cause the apparatus to generate new classification criteria for the significant place or route.

12. The computer program product of claim 11, further comprising code configured to cause the apparatus to reconcile or merge the existing classification criteria with the new classification criteria.

13. The computer program product of claim 8, wherein the classification criteria is based on at least one of position resolution criteria and energy consumption criteria.

14. The computer program product of claim 8, wherein the code configured to cause the apparatus to apply the localization configuration further comprises code configured to cause the apparatus to set at least one of Global Positioning System (GPS), local-area networking or cellular membership for use in localization in the apparatus.

15. An apparatus, comprising:
at least one processor; and
at least one memory including executable instructions, the at least one memory and the executable instructions being configured to, in cooperation with the at least one processor, cause the apparatus to perform at least the following:
select a localization configuration from a plurality of localization configurations, the selected localization configuration for use by the apparatus to determine positioning whenever the apparatus is at a particular location that is also classified as a significant place or route for the apparatus, wherein a localization configuration that provides positioning information at the particular location that is less accurate than positioning information provided by other localization configurations at the particular location is selected if it is determined that the less accurate positioning information provided by the selected localization configuration distinguishes the particular location from any another location that is also classified as a significant place or route for the apparatus; and wherein a localization configuration that provides positioning information at the particular location that is more accurate than positioning information provided by other localization configurations at the particular location is selected if it is determined that the less accurate positioning information provided by the other localization configurations does not distinguish the particular location from any other location that is also classified as a significant place or route for the apparatus;

receive position information;

determine whether the current location of the apparatus was previously classified as a significant place or route based on the position information;

if the current location of the apparatus was previously classified, apply a localization configuration in the apparatus based on the previous classification; and if the current location of the apparatus was not previously classified, determine if the current location of the apparatus is considered a significant place or route by evaluating location information accumulated in the apparatus over time to determine whether the apparatus has frequently visited the current location, wherein the other localization configurations comprise at least one of a satellite-based system, a cellular network-based system and a short-range wireless network.

16. The apparatus of claim 15, wherein at least one of the determining and applying steps are performed by another apparatus in communication with the apparatus.

17. The apparatus of claim 15, wherein the at least one memory and the executable instructions being configured to, in cooperation with the at least one processor, cause the apparatus to evaluate location information further comprises the at least one memory and the executable instructions being configured to, in cooperation with the at least one processor, cause the apparatus to consider at least one of user factors including number of visits to a location, duration of visits to the location, total number of different stops made within the boundaries of the location and distance between each of the stops, and location factors including what localization technologies are available in the location, reliability for each of the localization technologies and route types in the location.

18. The apparatus of claim 17, further comprising, if the current location of the apparatus can be considered a significant place or route, the at least one memory and the executable instructions being configured to, in cooperation with the at least one processor, cause the apparatus to generate new classification criteria for the significant place or route.

19. The apparatus of claim 18, further comprising the at least one memory and the executable instructions being configured to, in cooperation with the at least one processor, cause the apparatus to reconcile or merge the existing classification criteria with the new classification criteria.

20. The apparatus of claim 15, wherein the classification criteria is based on at least one of position resolution criteria and energy consumption criteria.

21. The apparatus of claim 15, wherein the at least one memory and the executable instructions being configured to, in cooperation with the at least one processor, cause the apparatus to apply the localization configuration further comprises the at least one memory and the executable instructions being configured to, in cooperation with the at least one processor, cause the apparatus to set at least one of Global Positioning System (GPS), local-area networking or cellular membership for use in localization in the apparatus.

22. The method of claim 1, wherein the selecting of a localization configuration for use by the apparatus is based on a distance between the particular location and another location that is also classified as a significant place or route for the apparatus.

23. The computer program product of claim 8, wherein the selecting of a localization configuration for use by the apparatus is based on a distance between the particular location and another location that is also classified as a significant place or route for the apparatus.

24. The apparatus of claim 15, wherein the selecting of a localization configuration for use by the apparatus is based on a distance between the particular location and another location that is also classified as a significant place or route for the apparatus.

* * * * *